Figure 1:
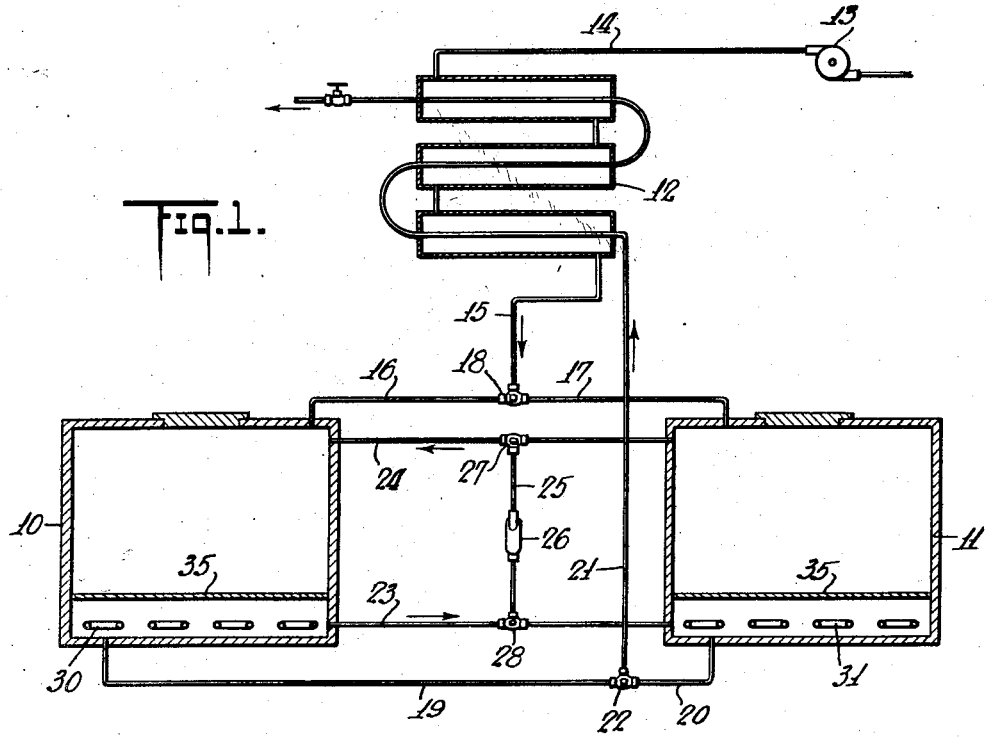

June 6, 1933.                P. W. HILLER                  1,912,896
                    ART OF REFRIGERATING FISH AT SEA
                         Filed Sept. 20, 1930

INVENTOR
Paul W. Hiller
BY
ATTORNEYS

Patented June 6, 1933

1,912,896

UNITED STATES PATENT OFFICE

PAUL W. HILLER, OF WILMINGTON, CALIFORNIA

ART OF REFRIGERATING FISH AT SEA

Application filed September 20, 1930. Serial No. 483,154.

This invention relates to the preservation of fish and more particularly to refrigeration of fish at sea.

Due to the extended voyages that fishing boats sometimes undertake in their quest for fish, the problem of preserving the catch by refrigeration during these protracted trips becomes of paramount importance. Fishing trips, especially when devoted to the search of such migratory and gregarious fish, as tuna fish, sometimes extend for thousands of miles from home landing. The catching of these fish during the trip is not a steady and continuous process, but a sporadic and uncertain one. That is, the boats may remain out several weeks and not catch a fish, and yet may suddenly strike a school of fish and catch a capacity load within a few hours. During these intervals of sporadic fishing, there is very little time for carefully dressing and stowing, or otherwise preserving the catch against spoilage. These fish are consequently left untreated during these fishing periods and permitted to gather heat sufficient to institute their decomposition. As a result of the higher temperatures developed by the untreated fish during these periods, an excess of refrigeration is subsequently required to retard their bacterial action.

The present invention provides a new and economical process of precooling fish at sea so as to retard their decomposition in the interval between the catching of the fish and the stowing and final freezing treatment thereof.

The process in accordance with the present invention includes the step of immersing the fish as soon as caught in a tank of freezing sea water. The temperature of this sea water is preferably maintained below 32° F.

Hitherto, the serious problem confronted in the freezing of fish by its direct immersion in a brine tank has been the salt penetration thereof. Regardless of the fact that sea fish subsist in salt water, they have developed a high selectivity as to salt requirements or resistance to salt penetration. The flesh of the fish is very susceptible to the penetration of salt, and in order, therefore, to preserve the edible qualities of these fish, the elimination of osmotic action (that is the transfer of salt from the freezing brine to the flesh of the fish) must be considered. This osmotic action depends to a certain extent upon the degree of saturation of the brine solution. The mechanical equipment and difficulties incident to the maintenance of the proper saturation of the brine is eliminated in accordance with the present invention by the use of sea water refrigerated to a freezing temperature. As the fish is caught, it is directly immersed into the refrigerating tank of sea water and decomposition thereof immediately retarded. By using freezing sea water as a refrigerant, the fish are placed in their natural element and the problem of osmotic action consequently solved.

When the men are no longer busy fishing, the catch may be further treated by any other suitable means and stowed, or if the trip back home is a short one and the brine tank sufficiently large, this catch may be retained therein and further treated when on land.

After the fish has remained in a brine tank a certain period, the sea water therein becomes contaminated with slimes, blood, scales and the like. Under these conditions, it becomes undesirable to reemploy this water for refrigerating a fresh catch, and a fresh charge of sea water must consequently be used. The invention provides therefor an apparatus for conserving some of the refrigerating qualities of the contaminated sea water before it is discharged, and includes a plurality of brine tanks so arranged that the freezing brine of any one tank after its use has been discontinued may be utilized to partially cool the brine being introduced in any other tank. In this way greater economy in refrigerating equipment is effected and correspondingly greater storage space provided.

The invention further consists in the new and novel features of operation and the new and improved arrangement and combination of steps in the process as well as original features of construction and combination of parts hereinafter set forth and claimed.

Figure 2:
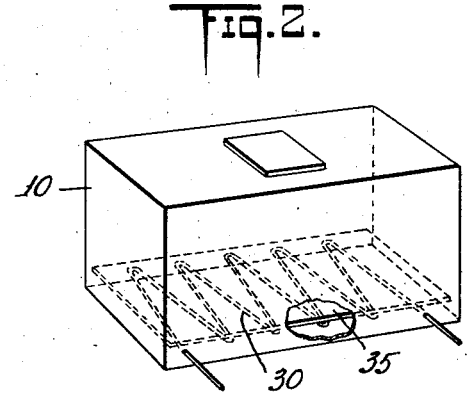

In the accompanying drawing there is shown, for purposes of illustration, one form of a device embodying the invention, in which Fig. 1 is a diagrammatic view of an arrangement constituting a plurality of brine tanks shown in vertical section, and interconnected by a piping system, including a heat exchanger, and Fig. 2 is a perspective view partially in section showing details of a brine tank.

Referring to the accompanying drawing, there is shown two brine tanks 10 and 11 having connections to a suitable heat exchanger unit 12. In order to fill these tanks a pump 13 is provided which is connected to a pipe 14 leading into the heat exchanger unit 12. The brine is pumped from the sea through this pipe 14 into the heat exchanger 12, and then through a pipe 15 leading from the outlet of said exchanger. This pipe 15 is provided with two branch extensions 16 and 17 leading into the top of the tanks 10 and 11 respectively. The point of intersection of the branch pipes 16 and 17 and the pipe 15 is provided with a two-way valve 18 which serves to selectively control the flow of brine into either one of the tanks.

In order to empty these tanks, there are provided two pipes 19 and 20, leading from the bottom of these tanks 10 and 11, respectively, and having a common connection 21 to the heat exchanger unit 12. At the point of intersection of the three pipes 19, 20 and 21, there is provided a two-way valve 22 which selectively permits any one of the tanks to be emptied.

In order to provide means for circulating the brine through the tanks, pipe connections 23 and 24 are provided leading from the top and the bottom of the tanks respectively, and joined together by a pipe 25 having a circulating pump 26 attached hereto. Suitable controlling means are provided, for instance the intersecting point of the two pipes 24 and 25 as well as the intersecting point of the two pipes 23 and 25 may be provided with two-way valves 27 and 28, respectively. By means of these valves, the brine from any one of the tanks may be circulated.

For the purpose of cooling the brine in the tanks 10 and 11, refrigerating coil systems 30 and 31 are provided, disposed preferably near the bottom of the tank. Above each of these coils is disposed a tray 35 which serves to hold the fish away from contact therewith.

Let us assume in the operation of this apparatus that the tank 10 is filled with cold brine and fish; that the tank 11 is emptied; and that it is desired to empty tank 10 and prepare tank 11 for chilling. Under these conditions, the pump 13 is started and the valve 18 manipulated so that sea water is pumped through the pipe connection 14 into the heat exchanger unit 12, to the pipes 15 and 17, and into the top of the tank 11. At the same time, the valve 22 is manipulated to permit the brine from the tank 10 to gravitate through the pipe 19 into the pipe 21, through the heat exchanger unit, and into heat transferring relationship with the incoming charge of sea water, and then out to the sea. When the tank 10 has been emptied and tank 11 has been filled, the circulating circuit is started by manipulating the valves 27 and 28 and operating the pump 26.

It should be noted that this arrangement permits the use of a smaller refrigerating equipment, and consequently provides for a correspondingly greater storage space.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

Having thus described my invention, what I claim as new and desire to secure by Letters Patent is:

1. The process of preserving fish at sea which includes the step of immersing the fish into a tank of freezing sea water soon after they are caught, discharging the sea water from said tank, and using the discharged sea water to partially cool a charge of fresh sea water.

2. An apparatus for preserving fish at sea, including a plurality of brine tanks, a heat exchanger, means for discharging the brine from any one of said tanks through the heat exchanger, and means for filling another of said tanks with fresh brine through said heat exchanger and in heat transferring relationship with the brine being discharged from said first mentioned tank.

3. An apparatus for preserving fish at sea, including a plurality of brine tanks, a heat exchanger, means for discharging the brine from any one of said tanks through the heat exchanger, means for filling another of said tanks with fresh brine through said heat exchanger and in heat transferring relationship with the brine being discharged from said first mentioned tank, a refrigerant container, and means for circulating the brine to and from one of said tanks, and in heat interchanging relationship with said container but out of contact with the refrigerant in said container, and without altering the composition of said brine.

4. An apparatus for preserving fish at sea, including a tank adapted to receive the fish, pipe connections for delivering sea water to said tank and for returning the impure sea water from said tank to the sea, means for refrigerating the sea water on its way to the tank, a refrigerating coil within said tank for cooling the sea water to a low temperature, and pipe connections for withdrawing sea water from said tank and returning it to the tank to effect circulation over said refrigerating coil.

5. An apparatus for preserving fish at sea, including a tank adapted to receive the fish, pipe connections for delivering sea water to said tank and for returning the impure sea water from said tank to the sea, means for refrigerating the sea water on its way to the tank by utilizing the refrigerating value of the sea water on its way from the tank back to the sea, a refrigerating coil within said tank for cooling the sea water to a low temperature, and pipe connections for withdrawing sea water from said tank and returning it to the tank to effect circulation over said refrigerating coil.

Signed at Wilmington, in the county of Los Angeles, and State of California, this eleventh day of September, A. D. 1930.

PAUL W. HILLER.